US012415549B1

(12) United States Patent
Parikh et al.

(10) Patent No.: US 12,415,549 B1
(45) Date of Patent: Sep. 16, 2025

(54) MACHINE-LEARNED MODEL FOR DETECTING OBJECT RELEVANCE TO VEHICLE OPERATION PLANNING

(71) Applicant: Zoox, Inc., Foster City, CA (US)

(72) Inventors: Samir Parikh, Los Gatos, CA (US); Gowtham Garimella, Hayward, CA (US); Linjun Zhang, Foster City, CA (US); Chunlei Dai, San Jose, CA (US); Yousef Ali Emam, San Francisco, CA (US); Kai Zhenyu Wang, Foster City, CA (US); Woodrow Zhouyuan Wang, San Antonio, TX (US); Benjamin Isaac Mattinson, San Francisco, CA (US); Xiaobo Ren, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 293 days.

(21) Appl. No.: 18/132,289

(22) Filed: Apr. 7, 2023

(51) Int. Cl.
*B60W 60/00* (2020.01)
*B60W 40/02* (2006.01)
*G06N 3/0464* (2023.01)

(52) U.S. Cl.
CPC ........ *B60W 60/0027* (2020.02); *B60W 40/02* (2013.01); *G06N 3/0464* (2023.01); *B60W 2554/404* (2020.02); *B60W 2554/4045* (2020.02)

(58) Field of Classification Search
CPC ............ B60W 60/0027; B60W 40/02; B60W 2554/404; B60W 2554/4045; G06N 3/0464
See application file for complete search history.

(56) References Cited

U.S. PATENT DOCUMENTS

| 10,649,459 | B2 | 5/2020 | Wang |
| 11,157,010 | B1 * | 10/2021 | Narang ................ G06N 20/00 |
| 2021/0001884 | A1 * | 1/2021 | Alvarez ................ B60W 40/06 |
| 2021/0053570 | A1 * | 2/2021 | Akella ............ B60W 30/18163 |
| 2021/0191395 | A1 * | 6/2021 | Gao ................ B60W 60/00276 |
| 2022/0144303 | A1 * | 5/2022 | Agarwal ............ B60W 30/095 |
| 2023/0004805 | A1 * | 1/2023 | Tawari .................. G06V 10/25 |
| 2023/0085296 | A1 * | 3/2023 | Liu ...................... G06N 3/0455 |
| | | | 706/12 |

OTHER PUBLICATIONS

U.S. Appl. No. 15/963,833, filed Apr. 26, 2018.
U.S. Appl. No. 16/779,576, filed Jan. 31, 2020.

* cited by examiner

*Primary Examiner* — Naeem Taslim Alam
(74) *Attorney, Agent, or Firm* — Lee & Hayes, P.C.

(57) ABSTRACT

A machine-learned architecture for determining whether an object is relevant to a vehicle's action planning may comprise a convolutional neural network, graph neural network, and/or multi-layer perceptron that may determine a relevance score associated with an object that indicates indicating whether an object is likely to impact operation(s) of a vehicle. In some examples, the machine-learned architecture may use scene information and/or an object track to determine the relevance score.

20 Claims, 5 Drawing Sheets

MACHINE-LEARNED MODEL FOR DETECTING OBJECT RELEVANCE TO VEHICLE OPERATION PLANNING

BACKGROUND

In dense urban environments and other scenarios, the number of objects, both moving and stationary, that an autonomous vehicle detects may be high. The number of objects detected may directly affect the amount of computational bandwidth the autonomous vehicle uses (e.g., for tracking objects). However, not every object in an environment may be relevant to how the autonomous vehicle is operated, and identifying which objects are relevant to the autonomous vehicle's operations is non-trivial without human guidance.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
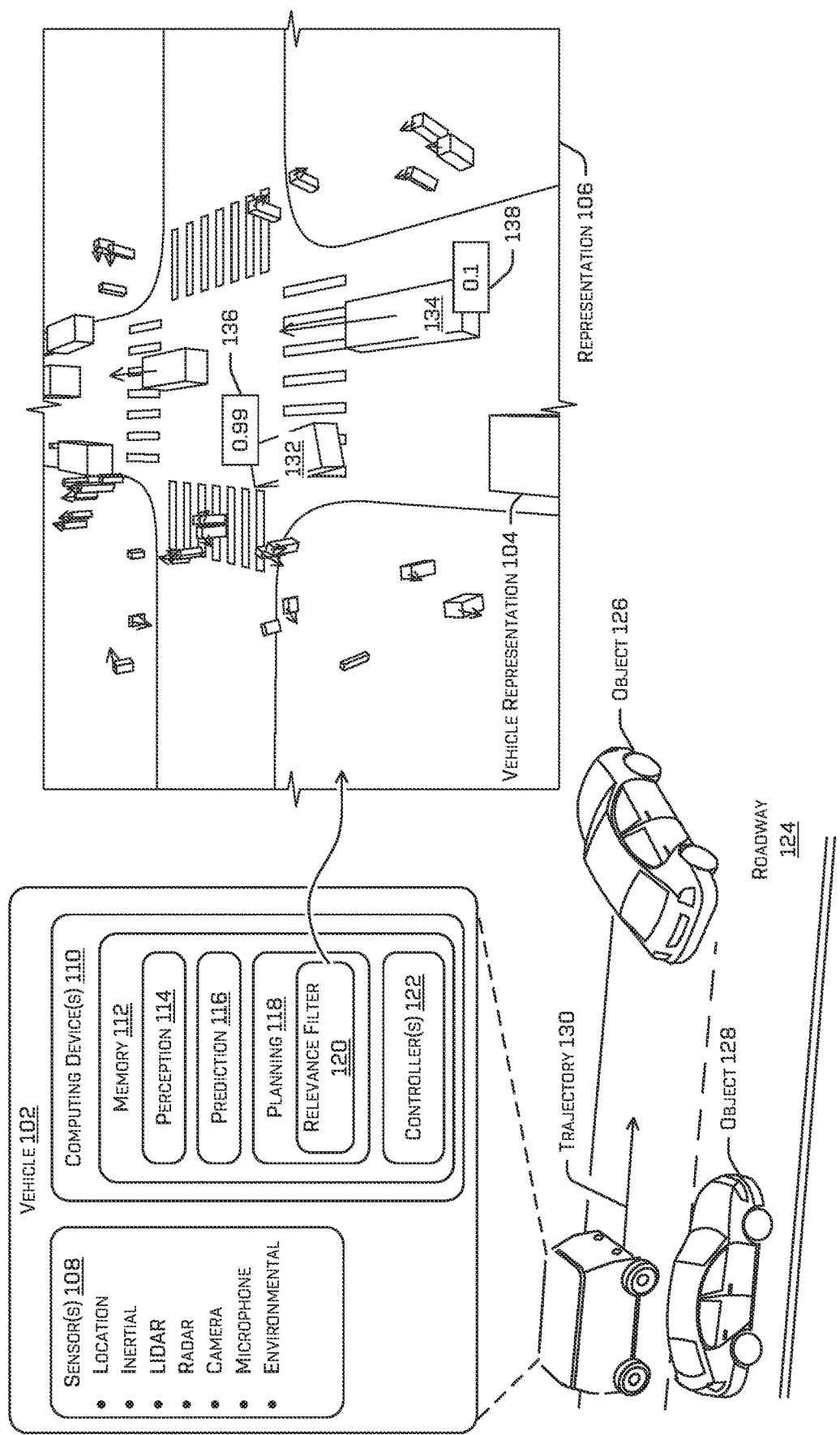
FIG. 1 illustrates an autonomous vehicle and an example scenario depicting functionality of the relevance filter discussed herein.

As discussed above, the number of objects detected by a vehicle may affect the computational complexity of keeping track of these object, which may increase computation time/latency, memory used, and decrease available processing hardware for other tasks. This may be problematic since the portion of a vehicle's computational bandwidth devoted to tracking objects, for example, may only be a portion of the vehicle's total computational bandwidth. Moreover, since some objects may not be relevant to a vehicle's operations, such as by heading a different direction from the vehicle or a path of the vehicle or lacking an intent to move in such a manner, a portion of the computational bandwidth used for tracking such objects may unnecessarily complicate the computations the vehicle uses to plan next actions by the vehicle. In total, this ends up increasing the time and/or computations required to plan a next action for the vehicle and may even by computationally prohibitive. Ultimately, in some such examples, this may lead to an unsafe situation where the vehicle is unable to react in time.

The techniques (e.g., hardware and/or software) discussed herein comprise a machine-learned model architecture for determining a relevance of an object to a next action of a vehicle. More specifically, the machine-learned model architecture, called a relevance filter herein, may determine a score in association with an object, whether dynamic (e.g., moving or capable of movement under its own propulsion and/or by being acted upon) or static. This relevance score may indicate a likelihood (e.g., a posterior probability) that an action or state of the object would impact what the vehicle plans to do next. For example, a pedestrian that is currently on the sidewalk may be about to cross a roadway in front of the vehicle. Although the current state of the pedestrian does not affect the vehicle, a relevance score determined by the relevance filter in association with the pedestrian may be relatively high. This relatively high score may cause a planning component of the vehicle to determine a current action and/or one or more future actions based at least in part on a track associated with the pedestrian. Note that "relatively high" may mean a risk score that meets or exceeds a risk score threshold and/or the risk score associated with the object may be one of a top m number of risk scores among risks scores for multiple objects, where m is a positive integer. A track associated with an object may identify historical and/or current characteristics associated with the object, such as position, heading, velocity, acceleration, object classification (e.g., pedestrian, vehicle, signage, construction site, cyclist), object state (e.g., green light, red light, door open, passenger loading/unloading), and/or the like. In some examples, a prediction component of the vehicle may use the track (e.g., historical record of the object) to determine a predicted track associated with the vehicle The relevance score discussed herein may be provided as input to a planning component in association with an object detection and/or object track with which the relevance score may be associated. The planning component may determine a current and/or one or more future operations of the vehicle based on this relevance score, object detection, and/or object track. The object detections may be determined by a perception component of the vehicle based at least in part on sensor data and a separate portion of the perception component may determine an object track associated with an object by determining that multiple object detections received over time are associated with a same object. In an additional or alternate example, only those objects for which a relevance score has been determined that meets or exceeds a threshold relevance score and/or that have a relevance score within the top m scores may be provided to the planning component. Those objects that meet either or both of these criteria may be considered active objects, whereas objects that don't meet this criteria may be considered inactive objects (despite those scenarios in which those inactive objects may be moving). Note that using the top m scores example to distinguish active from inactive objects may be useful in scenarios where no relevance scores meet or exceed the relevance score threshold. In such an instance, despite no objects meeting the relevance score threshold, up to m number of object detections/tracks may be provided to the planning component, such as the up to m object detection(s)/track(s) nearest the vehicle and/or nearest the relevance score threshold. In yet another example, if no relevance score meets the threshold, these scores and the associated object detections/tracks may be provided to the planning component, although in another example, none of the object detection(s)/track(s) may be provided to the planning component, meaning none of the object(s) or dynamic object(s) are relevant to the planning component's determinations.

The relevance filter discussed herein may comprise a machine-learned model that uses a top-down representation of an environment and one or more object tracks to determine a relevance score associated with an object. In some examples, the relevance score may be a likelihood (e.g., posterior probability), covariance, or any other suitable indication of score. The machine-learned pipeline may comprise a first machine-learned model that determines a first intermediate output using top-down representation of the environment and a second machine-learned model that determines a second intermediate output using at least a track associated with an object and up to as many tracks as there are objects detected by the vehicle.

In some examples, the first machine-learned model may comprise a convolutional neural network (although other neural networks or models may additionally or alternatively be used) and the second machine-learned model may comprise a graph neural network, although other types of neural networks or models can additionally or alternatively be use. The object track(s) may be represented as a graph that is processed by the graph neural network and the output of the graph neural network may comprise a graph comprising convolved or otherwise machine-learned model transformed features.

The top-down representation may comprise a data structure, such as a multi-channel image, where different channels of the image identify the existence, absence, and/or quality of a characteristic of the environment, as determined by the perception component based at least in part on sensor data received by the vehicle. For example, a portion of the top-down representation, such as a pixel, may indicate, depending on the channel of the image, the presence of an object at a location in the environment associated with that portion, an object classification of the object (e.g., one channel may indicate presence or absence of a cyclist or a portion of a cyclist at a particular location in the environment), object heading, object velocity, map data (e.g., existence of a sidewalk, existence of and/or direction of travel associated with a roadway, signage location(s) and/or states, static object locations and/or classifications), and/or the like.

The first intermediate output and the second intermediate output may be combined and the combined input may be used by at least a third machine-learned model and, in some examples, also a fourth machine-learned model. For example, the fourth machine-learned model may include a machine-learned model such as a multilayer perceptron or a machine-learned head that uses the combined input to generate an estimate of the top n actions associated with an object (e.g., the top n most likely actions that the object may take now or in the future) and/or an estimated action score associated with a predicted action of the object. This data may be provided as input to the third machine-learned model in addition to the combined output. The estimate of the top n actions may either be determined by determining estimated scores and ranking or by directly predicting the top n actions regardless of estimated action score.

The third machine-learned model may comprise a multi-layer perceptron, although other types of machine-learned models may be used. This multi-layer perceptron may determine a relevance score associated with an object based at least in part on the combined output of the first machine-learned model and the second machine-learned model and/or the estimated top n actions and/or estimated action scores associated therewith. In some examples, a relevance score may be determined for up to each of all the objects detected by the perception component of the vehicle.

In some examples, the machine-learned model architecture discussed herein may be trained using training data that may be determined from log data received from a vehicle (e.g., the same vehicle as discussed above or another vehicle). For example, the training dataset provided to the machine-learned model architecture during training may include log data received from a vehicle, which may include sensor data, perception data (which may include localization data), prediction data, state data (which may be an amalgamation of perception data, prediction data, and/or static data, such as map data), and/or planning data that identifies controls for controlling operations of the vehicle. In some examples, the log data may be further augmented with data labels generated by a deep learning model that generates (by classifying) text or other labels associated with the different types of log data, such as by labeling sensor data, perception data, prediction data, state data, and/or control data to characterize such data. Accordingly, the training of the machine-learned model architecture may be self-supervised or may be semi-self-supervised if some human labelling is used for the data labelling process.

In some examples, a data mining component may use a rule set to generate the training data set from the log data. For example, the data mining component may use the rule set to determine a score associated with an object identified in the log data, such as by an object detection generated by a vehicle. The score may indicate a relevance of that object to motion of the vehicle. The score may be based at least in part on, for example, a determination that the object did not interact with the vehicle, the object yielded to the vehicle, the vehicle yielded to the object (or, otherwise, that a behavior of the object was dependent on the vehicle), the vehicle followed the object, and/or that the object followed the vehicle, among other examples. These various interactions may be determined based at least in part on a trajectory of the vehicle and/or a trajectory of the object over time, as indicated in the log data. Additional or alternative data may be used to determine the significance of these interactions, including a distance or change in distance between the vehicle and the object, how nearly in time that the vehicle and the object occupied a same portion of the environment, whether that distance was less than a threshold distance at any point, whether a change in trajectory is associated with a trajectory of the other object/vehicle, or the like. In this manner, one or more objects may be scored and these scores (i.e., training scores) may be used as ground truth data as part of training data for the machine-learned model architecture discussed herein.

In some examples, a ground truth score (and their associated object detections) may be used to train the machine-learned model architecture by determining a loss that may be based on a difference between the machine-learned model architecture's output (i.e., the relevance score associated with an object) and the ground truth data (i.e., the score determined by the rule set based on the log data). This loss may be backpropagated through the machine-learned model architecture (i.e., altering any of the components of the machine-learned model architecture parameters to reduce the loss). This means that parameter(s) of any of the components of the architecture may be altered (using gradient descent) to reduce this loss such that, if the architecture repeated the process for the same object, the resultant loss would be less than it was on the last iteration. This process may be repeated for multiple iterations of data, known as a training dataset. The loss may, in some examples, be an L1 loss, L2 loss, Huber loss, square root of the mean squared error, cross-entropy loss, binary cross-entropy loss, or another loss function.

The techniques discussed herein may reduce the computational load to track and/or determine the relevance of objects in an environment associated with a vehicle. This may result in reducing the complexity of the processes run by the hardware and software of the vehicle to determine a course of action for controlling the vehicle and may result in a reduction in latency and increase in speed in this process. Moreover, the techniques discussed herein may increase the interpretability of operations of an autonomous vehicle for debugging and/or auditing purposes to discover how the autonomous vehicle came to control the vehicle in a particular manner. This is advantageous since machine-learned model architectures tend to determine outputs using high-dimensional processes that are difficult or impossible for humans to inspect and validate.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be an aircraft, spacecraft, watercraft, and/or the like.

Vehicle 102 is depicted as vehicle representation 104 in the representation 106. Representation 106 may be a depiction of log data generated by the vehicle 102, which may include perception data, prediction data, planning data, control data, and/or the like, as further discussed herein.

According to the techniques discussed herein, the vehicle 102 may receive sensor data from sensor(s) 108 of the vehicle 102. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 108 may generate sensor data, which may be received by computing device(s) 110 associated with the vehicle 102. However, in other examples, some or all of the sensor(s) 108 and/or computing device(s) 110 may be separate from and/or disposed remotely from the vehicle 102 and data capture, processing, commands, and/or controls may be communicated to/from the vehicle 102 by one or more remote computing devices via wired and/or wireless networks.

Computing device(s) 110 may comprise a memory 112 storing a perception component 114, a prediction component 116, a planning component 118, a relevance filter 120 that may comprise the machine-learned model architecture discussed herein, and/or system controller(s) 122. In some examples, the relevance filter 120 need not be part of the planning component 118 but may provide its output as input to the planning component 118. In some examples, the perception component 114 may include a simultaneous localization and mapping (SLAM) component.

In general, the perception component 114 may determine what is in the environment surrounding the vehicle 102 and the planning component 118 may determine how to operate the vehicle 102 according to information received from the perception component 114. For example, the planning component 118 may determine trajectory 124 for controlling the vehicle 102 based at least in part on the perception data, prediction data, a relevance score determined by the relevance filter 120, and/or other information such as, for example, one or more maps (such as a map determined according to the techniques discussed herein, prediction data, localization information (e.g., where the vehicle 102 is in the environment relative to a map and/or features detected by the perception component 114), and/or the like. x The trajectory 124 may comprise instructions for controller(s) 122 to actuate drive components of the vehicle 102 to effectuate a steering angle, steering rate, acceleration, and/or the like, which may result in a vehicle position, vehicle velocity, and/or vehicle acceleration. For example, the trajectory 124 may comprise a target heading, target steering angle, target steering rate, target position, target velocity, and/or target acceleration for the controller(s) 122 to track. In some examples, the trajectory 124 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the controller(s) 122 may comprise software and/or hardware for actuating drive components of the vehicle 102 sufficient to track the trajectory 124. For example, the controller(s) 122 may comprise one or more proportional-integral-derivative (PID) controllers to control vehicle 102 to track trajectory 124.

FIG. 1 depicts an example of such a trajectory 124, represented as an arrow indicating a heading, velocity, and/or acceleration, although the trajectory itself may comprise instructions for a controller, which may, in turn, actuate a drive system of the vehicle 102. For example, the trajectory 124 may comprise instructions for controller(s) 122 of the vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). The trajectory 130 may comprise a target heading, target steering angle, target steering rate, target position, target velocity, and/or target acceleration for the controller(s) to track.

In some examples, the perception component 114 may receive sensor data from the sensor(s) 108 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 114 may determine, based at least in part on sensor data, an object detection indicating an association of a portion of sensor data with an object in the environment. The object detection may indicate an object classification, sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, pose (i.e., position and heading), velocity, acceleration, and/or sensor data segmentation is correct/accurate (there may be confidence score generated for each in some examples). For example, the ROI may include a portion of an image or radar data identified by an ML model or ML pipeline of the perception component 114 as being associated with the object, such as using a bounding box, mask, an instance segmentation, and/or a semantic segmentation. The object classifications determined by the perception component 114 may distinguish between different object types such as, for example, a passenger vehicle, a pedestrian, a bicyclist, a delivery truck, a semi-truck, traffic signage, and/or the like.

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment using any of this sensor data or a combination thereof. For example, the perception component may detect dynamic objects, such as a cyclist, vehicle, pedestrian, or the like, and/or static objects, such as poles, traffic signage, general signage, a drivable surface, sidewalk, public furniture, building, etc.

In the depicted example, the perception component 114 may determine, based at least in part on sensor data, an object detection associated with object 126, a vehicle, and another object detection associated with object 128. Representations of these object detections are depicted as part of representation 106 as representation 132, which may be associated with object 126's object detection, and representation 134, which may be associated with object 128's object detection. These representations include a depiction of each three-dimensional ROI determined by the perception component 114 as part of each of the object detections for objects 126 and object 128. Representation 134 further includes an arrow depicting a current and/or predicted heading, position, velocity, and/or acceleration of object 128 that may also be part of the object detection determined in association with object 128. Object 128 may be stopped. The representation further includes depictions of object detections associated with a number of other pedestrians (smaller three-dimensional cuboids) and vehicles and their respective current and/or predicted headings, positions velocities, and/or accelerations that are unlabeled for clarity.

In some examples, the perception component 114 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

In some examples, any of this data determined by the perception component 114 may be indicated in a top-down representation of the environment. The top-down representation may comprise a data structure, such as a multi-channel image, where different channels of the image identify the existence, absence, or quality of a characteristic of the environment, as determined by the perception component based at least in part on sensor data received by the vehicle. For example, a portion of the top-down representation, such as a pixel, may indicate, depending on the channel of the image, the presence of an object at a location in the environment associated with that portion, an object classification of the object (e.g., one channel may indicate that presence or absence of a cyclist or a portion of a cyclist at a particular location in the environment), object heading, object velocity, map data (e.g., existence of a sidewalk, existence of and/or direction of travel associated with a roadway, signage location(s) and/or states, static object locations and/or classifications), and/or the like. Determining a top-down representation is discussed in more detail in U.S. Pat. No. 10,649,459, issued May 12, 2020, which is incorporated in its entirety herein for all purposes, and/or a top-down prediction associated with the environment, as described in more detail in U.S. patent application Ser. No. 16/779,576, filed Jan. 31, 2020, which is incorporated in its entirety herein for all purposes.

In some examples, object detections may be tracked over time. The perception component 114 and/or prediction component 116 may determine a track to associate with an object. For example, a track may associate two object detections generated at two different times as being associated with a same object and may comprise a historical, current, and/or predicted object position, orientation, velocity, acceleration, and/or other state (e.g., door state, turning state, intent state such as signaling turn) of that object. The predicted portion of a track may be determined by the prediction component 116, in some examples.

The data produced by the perception component 114 may be collectively referred to as perception data. Once the perception component 114 has generated perception data, the perception component 114 may provide the perception data to prediction component 116, the planning component 118, and/or the relevance filter. In an example where prediction data generated by the prediction component 116 is used to generate a track, the prediction component 116 may also output such data to the relevance filter. However, in at least one example, the relevance filter may be uncoupled from the prediction component 116 and just a current and/or historical portion of a track may be used by the relevance filter 120 to generate a relevance score associated with an object/object detection.

In some examples, the prediction component 116 may receive sensor data and/or perception data and may determine a predicted state of dynamic objects in the environment. In some examples, dynamic objects may include objects that move or change states in some way, like traffic lights, moving bridges, train gates, and the like. The prediction component 116 May use such data to a predict a future state, such as a signage state, position, orientation, velocity, acceleration, or the like, which collectively may be described as prediction data. For example, the prediction component may determine a prediction associated with vehicle object 128 indicating a predicted future position, orientation, velocity, acceleration, and/or state of object 128. In some examples, the prediction component 116 may comprise a pipeline of hardware and/or software, which may include one or more GPU(s), ML model(s), Kalman filter(s), and/or the like.

The relevance filter 120 may comprise the machine-learned model architecture discussed herein and may receive an object detection from the perception component 114 for which to determine a relevance score. To determine the relevance score, the relevance filter 120 may also receive a data structure indicating a top-down representation of the environment and/or a track associated with the object detection. The track may comprise current and/or historical data associated with the object detection in one example, although, in another example, the track may comprise current, historical, and/or predicted data associated with the object detection. This current, historical, and/or predicted data may indicate a series of classifications (for classifications that change over time, such as passenger loading/unloading, stopped, double-parked, parking, parked, door opened/closed, and/or the like), poses, velocities, accelerations, occlusion status (with respect to vehicle 102 or one or more sensors thereof), ROI, and/or the like associated with the object over time.

The relevance filter 120 may determine a number between 0 and 1, such as a logit, that indicates a relevance of motion and/or status of the object for operation(s) of vehicle 102 where 0 indicates no relevance (i.e., the vehicle 102 does not need to account for the object in planning an operation of the vehicle 102) and 1 indicates utmost relevance to the vehicle 102 (i.e., the vehicle 102 must account for the object in planning an operation of the vehicle 102). It is understood that a number between 0 and 1 is an arbitrary choice and any other suitable scoring regimen may be used, such as any positive integer, any positive integer between 0 and 100, a percentage, or any integer. In an additional or alternate example, the relevance filter 120 may determine a binary indication of whether an object is relevant to an operation of the vehicle 102, i.e., the relevance filter 120 may determine that the object is or is not relevant.

To give an example, the relevance filter 120 may determine a first relevance score 136 associated with object 126 of 0.99 and a second relevance score 138 associated with object 128 of 0.3. The planning component 118 may use the first relevance score 136 to ensure that object 126 is taken into account when determining an operation of vehicle 102. Conversely, the planning component 118 may use the second relevance score 138 to downweight object detection and/or track data associated with object 128. In an additional or alternate example, the first relevance score 136 may exceed a relevance score threshold, whereas the second relevance score 138 may not meet the relevance score threshold. In this example, object detection and/or track data associated with object 128 may not be used by the planning component 118 as part of determining an operation of the vehicle 102 (as represented by vehicle representation 104). For scores between 0 and 1 this threshold could be adjusted to any suitable threshold, such as 0.3, 0.4, 0.5, 0.7, 0.8 or any other suitable threshold, depending on the distribution of scores for objects in the environment.

Note that the relevance filter 120 may determine a relevance score for an object detection at each tick of the perception component or for every p number of ticks (computational output cycles), where p is a positive integer. This means that, although the planning component 118 might prioritize determining an operation based on object 126 and may downweight or not use data associated with object 126 as part of determining an operation at a first tick, at a second or next p ticks new scores may be determined and this may change how the objects are prioritized and/or used as part of determinations by the planning component 118.

The planning component 118 may use the perception data received from perception component 114, one or more relevance scores received from relevance filter 120, and/or prediction data received from the prediction component 116, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). In an example where a threshold is not used to exclude object detections from use by the planning component 118, the perception data and/or prediction data associated with an object and the relevance score associated therewith may be provided to the planning component 118 for up to all the object detections generated by the perception component 114 or for up to all the objects within a threshold distance of the vehicle 102. In an example where the threshold is used to exclude object detections from use by the planning component 118, only that perception data and/or prediction data for those objects having a relevance score associated therewith that meet or exceed the threshold relevance score may be provided to the planning component 118.

The planning component 118 may use the perception data, relevance score(s), and/or prediction data to determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 microsecond, half a second) to control the vehicle to traverse the route (e.g., in order to avoid any of the detected objects); and select one of the candidate trajectories as a trajectory 124 of the vehicle 102 that may be used to generate a drive control signal that may be transmitted to drive components of the vehicle 102. In another example, the planning component 118 may select the trajectory 124 based at least in part on determining the trajectory is associated with a greatest probability based at least in part on an output of the planning task decoder(s) discussed herein. FIG. 1 depicts an example of such a trajectory 124, represented as an arrow indicating a heading, velocity, and/or acceleration, although the trajectory itself may comprise instructions for controller(s) 122, which may, in turn, actuate a drive system of the vehicle 102.

The perception data, prediction data, planning data, and/or any other computational outputs determined by component(s) of the vehicle 102 may be stored in association with the sensor data as log data. This log data may be transmitted to a remote computing device (unillustrated in FIG. 1 for clarity) for use as at least part of training data for the relevance filter 120.

Example System

Figure 2:
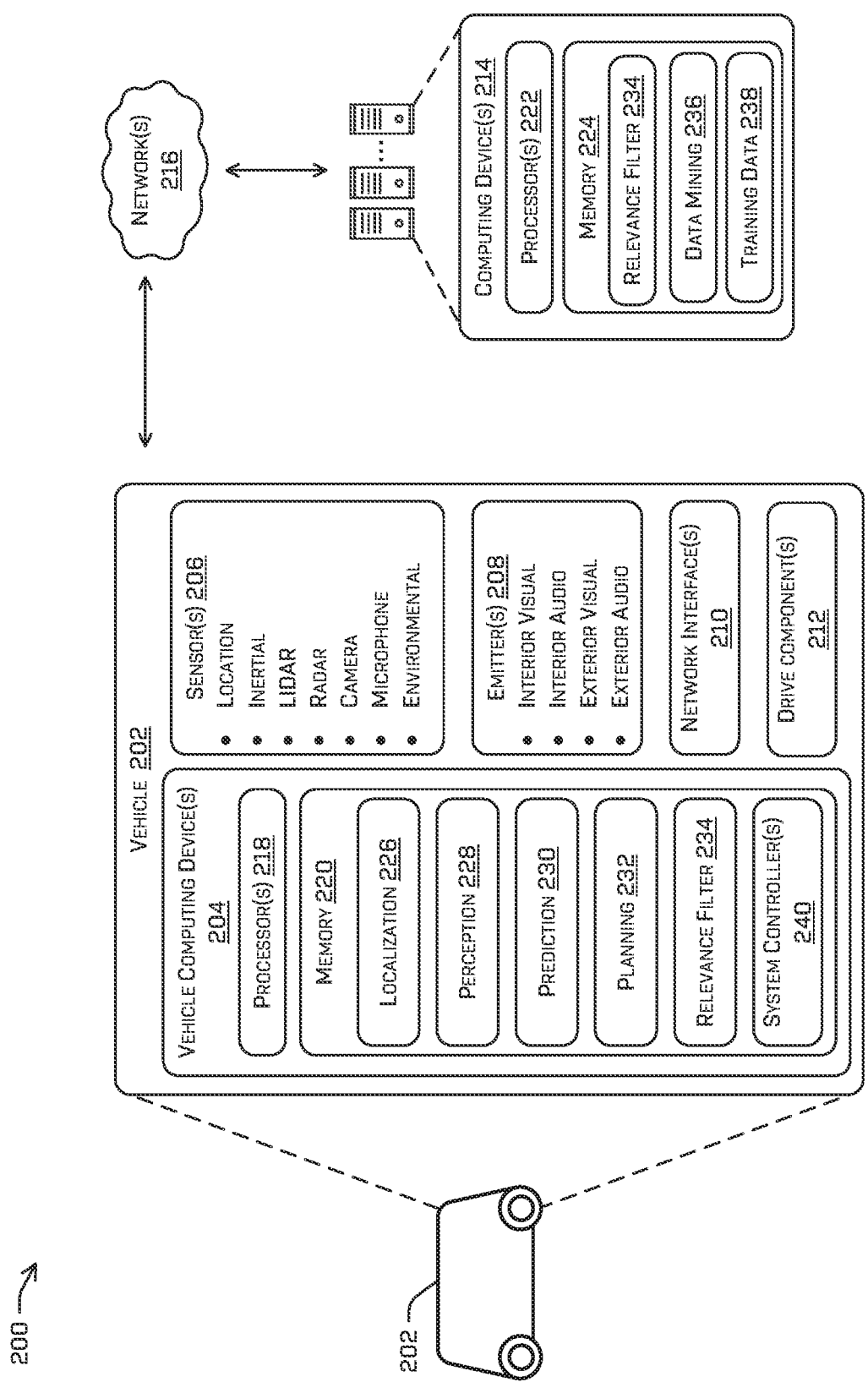
FIG. 2 illustrates a block diagram of an autonomous vehicle comprising a relevance filter and computing device(s) for training the relevance filter.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 110 and sensor(s) 206 may represent sensor(s) 108. The system 200 may additionally or alternatively comprise computing device(s) 214.

The sensor(s) 206 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 112. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), artificial intelligence (AI) hardware and/or accelerator (which may be any one or more of the previous processors or a stand-alone purpose designed chip) and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, relevance filter 234, and/or system controller(s) 240—zero or more portions of any of which may be hardware, such as GPU(s), CPU(s), and/or other processing units. Perception component 228 may represent perception component 114, prediction component 230 may represent prediction component 116, planning component 232 may represent planning component 118, relevance filter 234 may represent relevance filter 120, and controller(s) 240 may represent controller(s) 122.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data. In some examples, localization component 226 may provide, to the perception component 228 and/or prediction component 230, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects in the environment. For example, the top-down representation may be an image with additional data embedded therein, such as where various pixel values encode the perception data discussed herein.

The prediction component 230 may predict a future state of an object in the environment surrounding the vehicle 202. For example, the future state may indicate a predicted object position, orientation, velocity, acceleration, and/or other state (e.g., door state, turning state, intent state such as signaling turn) of that object. Data determined by the prediction component 230 is referred to as prediction data. In some examples, the prediction component 230 may determine a top-down representation of a predicted future state of the environment. For example, the top-down representation may be an image with additional data embedded therein, such as where various pixel values encode the prediction data discussed herein.

The planning component 232 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 232 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The memory 220 and/or 224 may additionally or alternatively store a mapping system, a planning system, a ride management system, simulation/prediction component, etc.

As described herein, the localization component 226, the perception component 228, the prediction component 230, the planning component 232, relevance filter 234, and/or other components of the system 200 may comprise one or more ML models. For example, localization component 226, the perception component 228, the prediction component 230, the planning component 232, and/or the relevance filter 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

The relevance filter 234 may comprise a graph neural network, convolutional neural network, and/or one or more multi-layer perceptrons (MLPs) and/or other suitable machine-learned layers configured and arranged according to the architecture discussed further herein.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, ROBERTa, XLNet, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228 and/or simulated perception data and transmit the instructions to the system controller(s), which may control operation of the vehicle 202 based at least in part on the instructions.

In some examples, remote computing device(s) 214 may comprise a memory 224 storing a copy of the relevance filter 234, such as for training and/or updating the relevance filter 234. Memory 224 may further comprise a data mining component 236 and/or training data 238 generated by the data mining component 236, or as otherwise collated. The remote computing device(s) 214 may receive log data from the vehicle 202 comprising outputs of any of the localization component 226, perception component 228, prediction component 230, planning component 232, relevance filter 234, and/or controller(s) 24. The data mining component 236 may generate the training data 238 from this log data using a rule set. For example, the data mining component 236 may receive an object detection, a track associated with the object, and/or trajectory (ies) that the vehicle 202 executed. The data mining component 236 may generate a score associated with the object based at least in part on this data. The score may include multiple scores associated with the object over time and/or a single score associated with the object for a window of time or for a scenario (e.g., the vehicle 202 approaching and/or crossing an intersection, the vehicle 202 merging onto a roadway, the vehicle 202 making a successful lane change). The data mining component 236 may use the rule set may increment or decrement the score based on a variety of factors that implicate that the vehicle 202 determined a trajectory based (or not based) on a motion or status of the object.

For example, the data mining component 236 may determine a training score that indicates a ground truth relevance score based at least in part on an occupancy map-based scoring function. The occupancy map-based scoring function may receive log data that indicates that the vehicle 202 detected an object (i.e., an object detection). The data mining component 236 may discretize a top-down representation of the environment into a grid comprising cells. In some examples, the data mining component 236 may determine that the object and the vehicle 202 were located at points within a same cell of the grid. The data mining component 236 may determine a training score associated with the object based at least in part on a distance between a first location that the vehicle 202 occupied within the cell and a second location that the object occupied within the cell and/or an amount of time that passed between the vehicle 202 occupying the first location and the object occupying the second location. In some examples, if the amount of time that passed meets or exceeds a threshold time period, the relevance score may be set to a minimum value or may be down-weighted to indicate that the vehicle and the object likely didn't interact.

In some examples, the interaction may further be based at least in part on an interaction classification that may be determined based at least in part on determining whether the vehicle or the object entered the cell first (e.g., to determine that the interaction is a vehicle-object interaction or an object-vehicle interaction) and/or determining a first shape of a path associated with the vehicle and a second shape of a path associated with the vehicle. These paths may include an indication of the cell(s) occupied the vehicle or object, respectively, before and/or after the vehicle or object entered the cell. These paths may be provided to a classification machine-learned model or compared to canonic shapes, such as shapes associated with following, leading, crossing paths (e.g., going through a same junction from different entries to the junction), turning in front of another object, etc.

Once a score has been determined by the data mining component 236 in association with an object, that score may be used as a training score and may be associated both with the object detection associated with that object and the inputs that will be provided to the relevance filter 234 as part of training, such as a top-down representation and/or an object track associated with the object. This training score may be used to determine a loss based on a difference between the training score and a relevance score determined by the relevance filter 234 using the top-down representation and/or object track. The loss may be backpropagated through the relevance filter 234 and parameter(s) of any of the components of the relevance filter 234 may be altered to reduce this loss, such as part of gradient descent.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Relevance Filter Configuration

Figure 3:
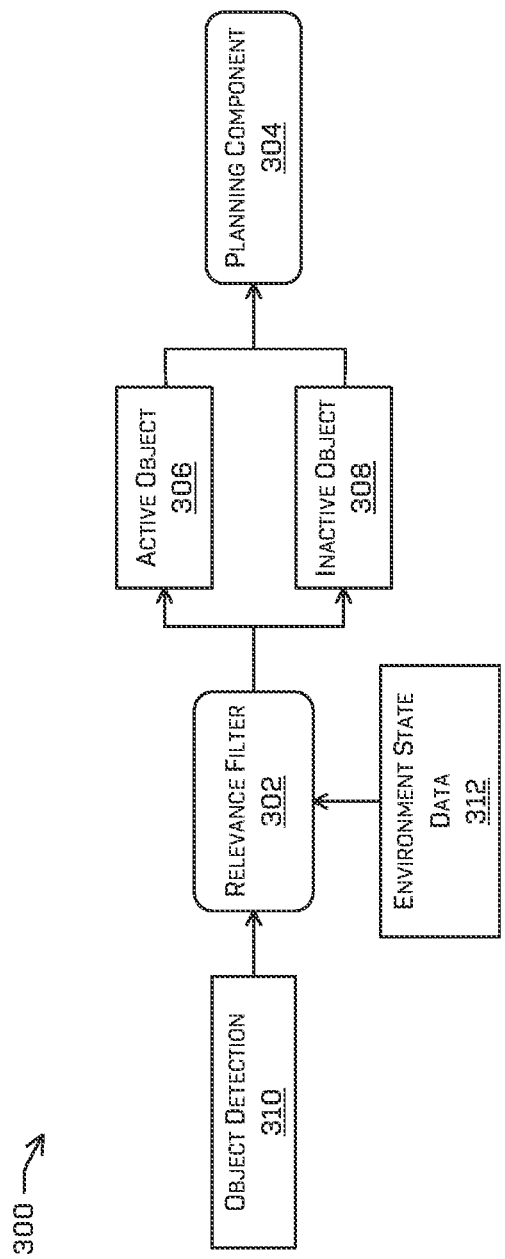
FIG. 3 illustrates a block diagram of an example configuration comprising the relevance filter discussed herein for determining a relevance score associated with an object and the relevance filter's configuration in relation to the planning component of a vehicle.

FIG. 3 illustrates a block diagram of an example configuration 300 for determining and using a relevance score or binary relevance indication associated with an object. Example configuration 300 may comprise a relevance filter 302. The relevance filter 302 may provide output to a planning component 304 that may determine a trajectory for controlling a vehicle or other operation(s) of the vehicle based at least in part on the output of the relevance filter 302. The example configuration 300 may be an example of a relevance filter that determines a binary indication of whether an object is relevant to a determination by the planning component 304 or a relevance filter that determines a relevance score that is used in conjunction with a threshold relevance score to determine which objects are relevant to a determination of the planning component 304. According to the latter example, a relevance score that meets or exceeds a relevance score threshold may indicate that an object is relevant to a determination of the planning component 304, whereas a relevance score that does not meet the relevance score threshold indicates that the object is irrelevant to a determination of the planning component 304. An object indicated as being relevant to a determination of the planning component 304 by the relevance filter 302 is depicted as an active object 306 in FIG. 3 and an object indicated as being irrelevant to a determination of the planning component 304 is depicted as an inactive object 308 in FIG. 3. In some examples, only data associated with an active object is transmitted to the planning component 304, such as an object detection, track, and/or the like associated with the active object, although in an additional or alternate example, data associated with inactive object(s) may also be transmitted to the planning component 304 with an indication that such data is associated with an inactive object.

In an additional or alternate example, the relevance filter 302 may determine a relevance score associated with an object and may or may not determine whether the object is active or inactive/relevant or irrelevant to the planning component 304. In such an example, the relevance filter 302 may transmit the relevance score associated with object data to the planning component, which may be configured to use the relevance score as part of determination(s) by the planning component, such as to weight data associated with an object.

Regardless, the relevance filter 302 may be configured to determine the binary output or relevance score associated with an object based at least in part on an object detection 310 determined by the perception component in association with the object and environment state data 312 determined by the perception component, both of which are discussed further herein.

Example Relevance Filter Machine-Learned Model Architecture

Figure 4:
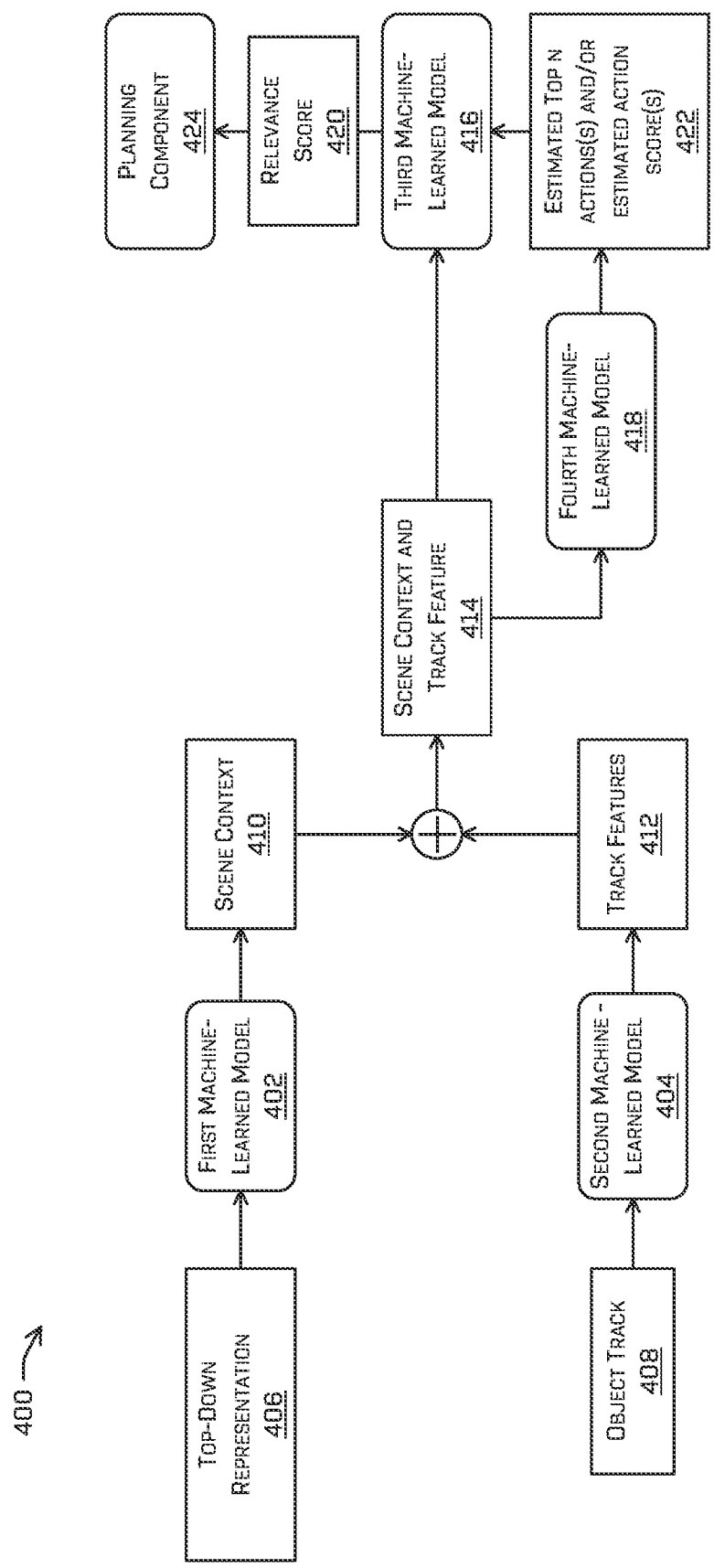
FIG. 4 illustrates a block diagram of an example architecture of the relevance filter configured to determine the relevance score associated with an object.

FIG. 4 illustrates a block diagram of an example architecture 400 of the relevance filter configured to determine the relevance score or binary relevance indication associated with an object. Hereinafter a relevance score is predominantly discussed, but it is understood that the relevance score may include a binary indication, a quantized indication (i.e., one of a limited number of scores), or a continuous score, such as a logit. The example architecture 400 may comprise a first machine-learned model 402 and a second machine-learned model 404. The first machine-learned model 402 may receive a top-down representation 406 of the environment as input and the second machine-learned model 404 may receive an object track 408 associated with the object for which a relevance score is to be determined.

The top-down representation 406 may include a data structure indicating characteristic(s) and/or state(s) of an environment associated with the vehicle 202. For example, the top-down representation 406 may indicate the presence or absence of a dynamic or static object, an object classification associated with an object, object pose and/or velocity, object state (e.g., door state, turning state, loading/unloading, intent state such as signaling turn), occluded region(s) of the environment (e.g., areas of the environment that are occluded to one or more sensors of the vehicle), map data (e.g., roadway locations, shapes, labels (e.g., one way lane, indication of the extents of a lane, yield area, stop line, signage type), and/or extents; static object locations and/or extents; static object type(s); etc.), and/or the like. In some examples, the top-down representation 406 may include current and/or historical data, such as top-down representation(s) from a current time, t, back to a time, t-m, in the past, where m is a positive integer.

In some examples, the data structure may be a multi-channel image, meaning a pixel of the image may be associated with multiple values, each of which may indicate a different feature of the top-down representation, or different ranges of values may indicate different features. According to the latter example, the values may range from 0 to 255, values between 0 and 127 may indicate that an object exists at the location associated with the pixel. Values between 0 and 7 may indicate a particular object heading (e.g., 0 degrees relative to the vehicle), values between 8 and 15 may indicate a second object heading (e.g.,-30 degrees relative to the vehicle), and so on. Different values among values between 0 and 7 may indicate different object classifications and/or different states of an object. The remaining values (129-255) may indicate various map features, such as the existence of a lane, signage, a building, parking space, passenger drop-off/pickup location, or the like; occluded regions of the environment; and/or the like. Note that the encoding described herein is just an example and is given to facilitate understanding.

In an additional or alternate example, the top-down representation 406 may comprise a graph, where a node of the graph may indicate any of the features discussed above and may be associated with a location in the environment, an object, a region, etc. The top-down representation 406 data structure may encode the data discussed herein in any other manner.

A portion of this top-down representation may be associated with the object for which a relevance score is being determined, but the top-down representation may include more than just this portion, in some examples. In some examples, the top-down representation 406 may contain any of this data for one or more time steps from a time at which most recent sensor data and/or perception data was received, t, to a time in the past, t-m, where m is a positive integer representing the number of time steps in the past. For example, where m is 5, to give a non-limiting example (m may be any other positive integer), may include such data for a current time and for five time steps into the past. These time steps may be associated with an increment of time, such as 10 milliseconds, 50 milliseconds, 75 milliseconds, 0.1 seconds, 0.5 seconds, 1 second, 2 seconds, or any other unit of time.

The object track 408 provided to the second machine-learned model 404 may comprise one or more object detections associated with an object. For example, the architecture 400 may be uncoupled from the prediction component and the object track 408 may indicate current and/or historical object a. The historical object data may be associated with a same or different number of time steps into the past as the top-down representation 406 in an example where the top-down representation 406 includes both current and historical environment state data. For example, the object track 408 may comprise object track data and/or object detection data from a current time, t, back to a time, t-m, in the past. Regardless, the object track 408 may indicate object classification, pose, velocity, acceleration, and/or state, as determined by the perception component and, in some examples, the prediction component. In some examples, the object track 408 may further indicate object detection data determined by the perception component, such as an ROI, confidence score, sensor data segmentation, and/or the like determined by the perception component in association with the object. In some examples, since the second machine-learned model 404 may include a graph neural network, the object track 408 may comprise a graph where each node indicates object track data associated with the object at different times. In some examples, the graph may include node(s) associated with one or more other objects that have been detected by the perception component.

The first machine-learned model 402 may comprise a convolutional neural network (CNN), such as ResNet-50, ResNet-101, VGGNet, DenseNet, PointNet, Xception, ConvNeXt, or the like, for examples where the top-down representation 406 comprises a data structure such as an image. In examples where the top-down representation 406 comprises a graph, the first machine-learned model 402 may comprise a graph neural network (GNN), such as a GCN, AGCN, DCNN, GAT, GAAN, GraphSEN, Highway GCN, Tree LSTM, Graph LSTM, FastGCN, or the like. The first machine-learned model 402 may determine scene context 410 using the parameters and training of the CNN. Scene context 410 may include a set of features represented as a tensor or high-dimensional field that indicate features determined by the CNN. These features may include high-dimensional data and/or processes that may be difficult or impossible for humans to inspect or validate, as they may include machine-encoded features generated by the convolutional components of the CNN.

The second machine-learned model 404 may comprise a GNN that may determine track features 412 using the parameters and training of the GNN and based at least in part on the object track 408. The track features 412 may comprise a graph comprise nodes that represent features of the object at different points in time and/or may comprise such features for one or more additional objects in the environment. Note that the nodes of the track features 412 are humanly interpretable (e.g., they may be associated with time and/or space), but the feature(s) associated with a node may not be similarly easily humanly interpretable or inspectable, as they may be a tensor.

Once the scene context 410 and track features 412 have been generated, a portion of the track features 412 associated with the object may be extracted and aggregated with scene context 410 to form scene context and track feature 414. This extraction may include determining the nodes and associated features of the graph that are associated with the object for which a relevance score is to be generated since the track features 412 graph may include nodes associated with different objects. Aggregating the scene context 410 and the extracted portion of the track features 412 may comprise concatenating the scene context 410 and the feature(s) from those nodes associated with the object. Additionally or alternatively aggregating the scene context 410 and the extracted portion of the track features 412 may comprise one or more machine-learned layer(s), such as multi-headed attention layer(s), a multi-layer perceptron (MLP), or the like.

Scene context and track feature 414, as aggregated, may be provided as input to a third machine-learned model 416. In some examples, the scene context and track feature 414 may additionally be provided as input to a fourth machine-learned model 418, although this may be optional. The third machine-learned model 416 may include a first multi-layer perceptron (MLP) and the fourth machine-learned model 418 may include a second MLP. The third machine-learned model 416 may be trained to determine the relevance score 420 associated with the object. For example, the third machine-learned model 416 may determine a logit and/or binary output using the scene context and track feature 414 according to the trained parameters of the MLP composing the third machine-learned model 416. In some examples, the third machine-learned model 416 may determine the relevance score 420 further based on an output of the fourth machine-learned model 418, an estimated top n actions associated with an object and/or estimated action scores. Regardless, the relevance score 420 may be provided as input to a planning component 424 of the vehicle.

In some examples, the fourth machine-learned model 418 may determine the estimated top n action(s) associated with an object and/or estimated score(s) 422 associated with different actions the object may take. In some examples, the fourth machine-learned model 418 may determine this data based at least in part on the scene context and track feature 414. The estimated top n action(s) may be an estimate of the top n actions ranked by estimated action score, where n is a positive integer, such as 3, 5, 10, 20, 50, or the like. For example, an action could include a canonic action like, taking a left/right lane change, left/right turn, continuing a current action, stopping, accelerating, and/or the like. The fourth machine-learned model may determine an estimated action score associated with the action. For example, the estimated score (an action score) may indicate a likelihood (e.g., a posterior probability, confidence score) of the object making a specific action at a current and/or future time (e.g., within a time window from a current time to a future time). In some examples, the fourth machine-learned model may determine multiple estimated scores associated with an action, such as determining estimated scores for multiple sequential time windows. In some examples, the number of actions may exceed n and be ranked by estimated score. The top n actions by estimated score may be provided as input to the third machine-learned model. In an additional or alternate example, all the estimated scores may be provided as input tot the third machine-learned model. The third machine-learned model 416 may optionally use any of these outputs of the fourth machine-learned model 418 to determine the relevance score 420 or may use none of them.

In an example that uses the estimated action score(s) associated with an object, the third machine-learned model 416 may determine a relevance score associated with a predicted action of the object. For example, the third machine-learned model 416 may determine a relevance score for up to each of the actions for which an estimated action score was determined by the fourth machine-learned model. In such an example, the planning component may determine multiple possible future scenarios based on combinations of different possible actions by one or more objects. These possible future scenarios may be weighted based at least in part on the action score(s) associated with the predicted actions and the training of the planning component may be configured to use these multiple possible future scenarios as input and to determine a set of candidate trajectories as an output. The planning component may be further configured to determine a control trajectory by selecting a trajectory from among the candidate trajectories based at least in part on a cost function and/or an additional machine-learned model component.

In some examples, training the first machine-learned model 402, second machine-learned model 404, and third machine-learned model 416 (and fourth machine-learned model 418 in examples where the fourth machine-learned model 418 is used) may include end-to-end training where the parameter(s) of any of these machine-learned models may be tuned as part of gradient descent based at least in part on a loss determined based on the relevance score 420 and/or the estimated top n action(s) and/or estimated action score(s) 422. In an additional or alternate example, one or more of these machine-learned models may be held constant while any number of the other models may be altered.

In some examples, the loss may be determined based at least in part on a difference between the relevance score 420 and a training score. The loss may be determined based on a loss function, such as a binary cross entropy function (if the third machine-learned model 416 outputs a binary output) or cross entropy loss otherwise, comparing the interaction between the vehicle and an object and the object's interaction with the vehicle. For example, as discussed above, the training score may be determined by the data mining component 236.

Example Process to Determine a Relevance Score

Figure 5:
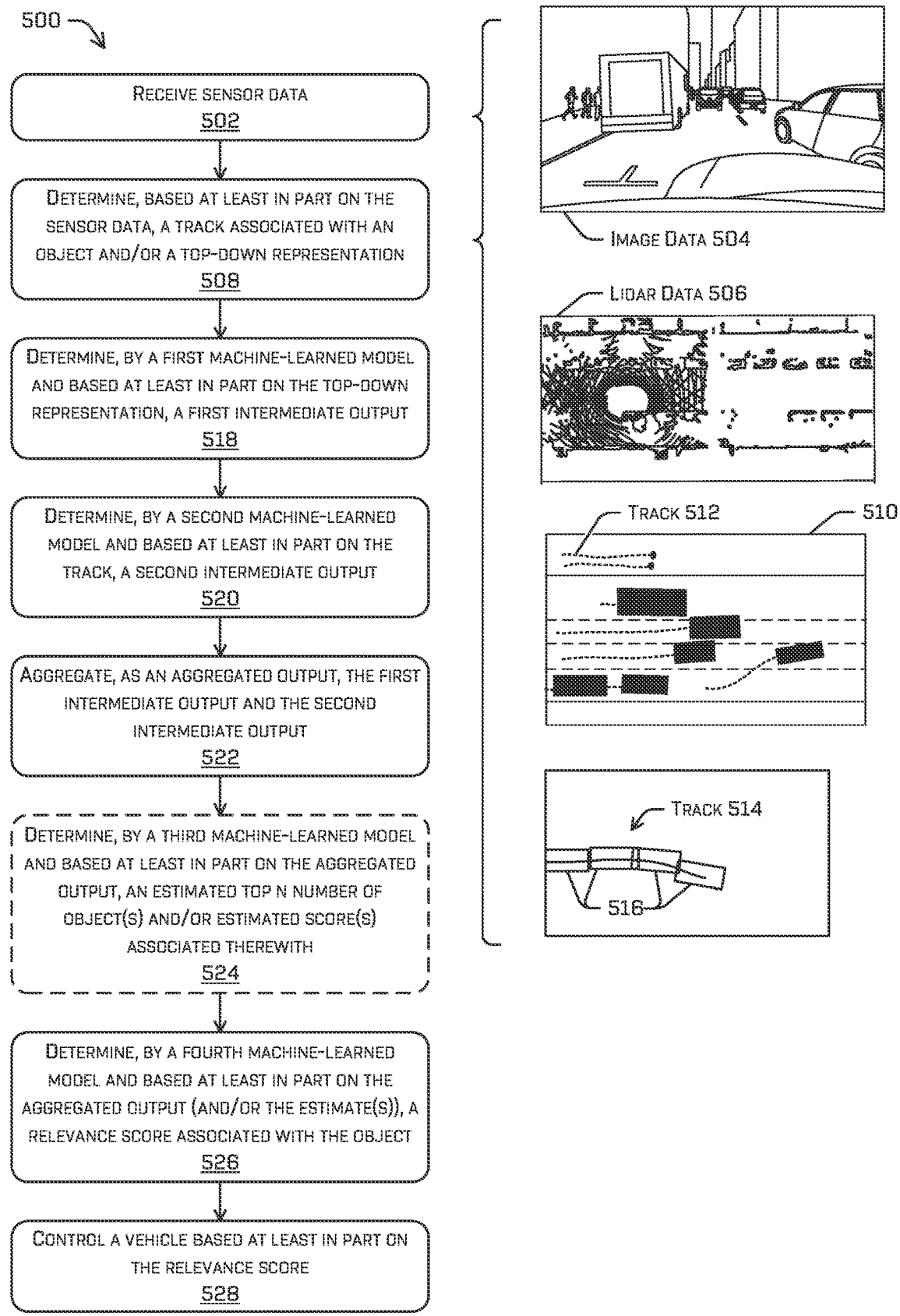
FIG. 5 illustrates a flow diagram of an example process for determining a relevance score for an object using the relevance filter discussed herein.

FIG. 5 illustrates a flow diagram of an example process for determining a relevance score for an object using the relevance filter, according to the disclosure herein. In some examples, example process 500 may be executed by a vehicle, such as vehicle 202, although it is understood that example process 500 may be executed at a remote computing device, such as during training. In the latter example, operation 528 may be skipped or may be used to control a simulated vehicle as part of a simulation. In some examples, at least part of example process 500 may be accomplished by example architecture 400. For example, the example architecture 400 may execute operations 518-526.

At operation 502, example process 500 may comprise receiving sensor data, according to any of the techniques discussed herein. To give a practical example, FIG. 5 includes a depiction of image data 504 and lidar data 506, although additional or alternate sensor data could be received. The image data 504 and lidar data 506 depict sensor data associated with an environment that a vehicle is traversing and includes depictions or portions associated with a variety of objects, such as trucks, pedestrians, and passenger vehicles. The lidar data 506 is simplified to a top-down representation of the lidar data.

At operation 508, example process 500 may comprise determining, based at least in part on the sensor data, a track associated with an object and/or a top-down representation, according to any of the techniques discussed herein. FIG. 5 illustrates an example image simplifying a top-down representation 510 of the environment, depicting roadway edges with solid lines, lane edges in dash lines, and space occupied by objects in black. FIG. 5 further illustrates tracks associated with any moving objects as dotted curves. For example track 512 may be associated with a pedestrian. A more detailed track 514 depicts object poses 516 over time, illustrating the object track's temporal data structure. For example, the object track may have different nodes associated with different time steps, each of which may indicate characteristic(s) of the object at the different time steps. In some examples, the architecture 400 may determine a relevance score for up to all of the objects detected by the perception component. For simplicity, however, the architecture 400 may determine at least one relevance score associated with an object.

At operation 518, example process 500 may comprise determining, by a first machine-learned model and based at least in part on the top-down representation a first intermediate output, according to any of the techniques discussed herein. For example, the first machine-learned model may include first machine-learned model 402 and the first intermediate output may comprise scene context 410. In some examples, scene context 410 may be considered hidden layer output.

At operation 520, example process 500 may comprise determining, by a second machine-learned model and based at least in part on the track, a second intermediate output, according to any of the techniques discussed herein. For example, the second machine-learned model may include second machine-learned model 404 and the second intermediate output may comprise track features 412. In some examples, track features 412 may be considered hidden layer output.

At operation 522, example process 500 may comprise aggregating, as an aggregated output, the first intermediate output and the second intermediate output, according to any of the techniques discussed herein. For example, the aggregated output may comprise the scene context and track feature 414. In some examples, the aggregating may comprise extracting a salient portion of the track features 412 associated with an object since the track features 412 may be a graph. This extraction may comprise taking data indicated by a node of the graph and populating part of a tensor, along with any other data taken from other nodes of the graph that are associated with the object for which a score is being determined. Collectively, this tensor may indicate the features of up to all of the nodes of the graph composing track features 412 that are associated with the object for which a relevance score is being determined. In instances where multiple objects are being scored, multiple tensors may be created, one for each object.

At operation 524, example process 500 may comprise determining, by a third machine-learned model and based at least in part on the aggregated output, an estimated top n actions(s) and/or estimated score(s) associated therewith, according to any of the techniques discussed herein. For example, the third machine-learned model may include the fourth machine-learned model 418 and the estimated top n action(s) and/or estimated score(s) may include estimated top n actions(s) and/or estimated score(s) 422. As discussed above, operation 524 may be optional. In some examples, operation 524 may include determining estimated score(s) associated with the action(s) without determining the ranking or top n actions.

At operation 526, example process 500 may comprise determining, by a fourth machine-learned model and based at least in part on the aggregated output (and/or the estimate(s) discussed above), a relevance score associated with the object, according to any of the techniques discussed herein. For example, the fourth machine-learned model may include the third machine-learned model 416 and the relevance score may include relevance score 420. This machine-learned model may have an output head that determines a continuous score, such as a logit and/or an output head that determines a binary indication of whether an object is relevant to an operation of the vehicle. In an example that uses the estimated action score(s) associated with an object determined by the third-machine-learned model, the fourth machine-learned model may determine a relevance score associated with a predicted action of the object. For example, the fourth machine-learned mode may determine a relevance score for up to each of the actions for which an estimated action score was determined by the fourth machine-learned model.

At operation 528, example process 500 may comprise controlling a vehicle based at least in part on the relevance score, according to any of the techniques discussed herein. For example, the relevance score may be transmitted to a planning component of the vehicle in association with an object detection and/or track that are also associated with the object for which the relevance score was generated. In some examples and as discussed above, for those objects associated with a relevance score that either indicates that the object is not relevant (using a binary indication) or that does not meet or exceed a threshold relevance score, the object detection and/or track may be withheld from the planning component. In yet another example, even if the relevance score indicates that the object is relevant, the relevance score and associated data may still be provided to the planning component. In this latter example, the planning component may use the relevance score to downweight the influence of the data associated with any such objects as part of determining an operation of the vehicle, such as determining a trajectory of the vehicle, determining to open/close a door of the vehicle, determining to activate an emitter of the vehicle, and/or the like. In such examples, a reduction in computational resources required is achieved by only sending those portions of data which are relevant to the safe operation of the vehicle, thereby improving the function of the computer, improving safe outcomes by allowing proportionally more resources to be dedicated to those relevant objects, and the like.

In an example that uses the estimated action score(s) associated with an object determined by the third-machine-learned model discussed herein, the planning component may determine multiple possible future scenarios based on combinations of different possible actions by one or more objects. These possible future scenarios may be weighted based at least in part on the action score(s) associated with the predicted actions and the training of the planning component may be configured to use these multiple possible future scenarios as input and to determine a set of candidate trajectories as an output. The planning component may be further configured to determine a control trajectory by selecting a trajectory from among the candidate trajectories based at least in part on a cost function and/or an additional machine-learned model component.

Example Clauses

A: A system comprising: one or more processors; and a non-transitory memory storing processor-executable instructions that, when executed by the one or more processors, cause the system to perform operations comprising: receiving sensor data; determining, based at least in part on the sensor data, a top-down representation of an environment; determining, based at least in part on the sensor data, a track associated with an object, the track identifying at least one of a current or previous characteristic associated with the object; determining, by a first machine-learned model and based at least in part on the top-down representation, a first intermediate output; determining, by a second machine-learned model and based at least in part on the track, a second intermediate output; determining, by a third machine-learned model and based at least in part on the first intermediate output and the second intermediate output, a relevance score associated with the object indicating an extent to which an action associated with the object is associated with a vehicle; and controlling the vehicle based at least in part on the relevance score.

B: The system of paragraph A, wherein the first machine-learned model comprises a convolutional neural network, the second machine-learned model comprises a graph neural network, and the third machine-learned model comprises a multi-layer perceptron.

C: The system of either paragraph A or B, wherein: the second intermediate output comprises a graph feature; and the operations further comprise determining a first portion of the graph feature associated with the object and associating the first portion with a second portion of the first intermediate output.

D: The system of any one of paragraphs A-C, wherein: the operations further comprise determining, by a fourth machine-learned model and based at least in part on the first intermediate output and the second intermediate output, an estimated action score associated with a future action of the object; and the third machine-learned model determines the relevance score further based at least in part on at least one of the estimated action score.

E: The system of any one of paragraphs A-D, wherein the object is a first object and controlling the vehicle comprises: determining, by a planning component and based at least in part on first data associated with a second object, a trajectory for controlling the vehicle; and determining that the relevance score associated with the object is less than or equal to a threshold score, wherein determining the trajectory is independent of second data associated with the first object based at least in part on determining that the relevance score is less than or equal to the threshold score.

F: The system of any one of paragraphs A-E, wherein: the object is a first object, the vehicle is a first vehicle, and the environment is a first environment; the first machine-learned model, the second machine-learned model, and the third machine-learned model are trained using training data determined from log data indicating movement of a second object in a second environment relative to a second vehicle or the first vehicle; and generating the training data comprises determining, based at least in part on a rule set and the log data, a training score associated with the second object.

G: One or more non-transitory computer-readable media storing processor-executable instructions that, when executed by one or more processors, cause one or more processors to perform operations comprising: receiving sensor data; determining, based at least in part on the sensor data, a top-down representation of an environment; determining, based at least in part on the sensor data, a track associated with an object, the track identifying at least one of a current or previous characteristic associated with the object; determining, by a first machine-learned model and based at least in part on the top-down representation, a first intermediate output; determining, by a second machine-learned model and based at least in part on the track, a second intermediate output; determining, by a third machine-learned model and based at least in part on the first intermediate output and the second intermediate output, a relevance score associated with the object indicating an extent to which an action associated with the object is associated with a vehicle; and controlling the vehicle based at least in part on the relevance score.

H: The one or more non-transitory computer-readable media of paragraph G, wherein the first machine-learned model comprises a convolutional neural network, the second machine-learned model comprises a graph neural network, and the third machine-learned model comprises a multi-layer perceptron.

I: The one or more non-transitory computer-readable media of either paragraph G or H, wherein: the second intermediate output comprises a graph feature; and the operations further comprise determining a first portion of the graph feature associated with the object and associating the first portion with a second portion of the first intermediate output.

J: The one or more non-transitory computer-readable media of any one of paragraphs G-I, wherein: the operations further comprise determining, by a fourth machine-learned model and based at least in part on the first intermediate output and the second intermediate output, an estimated action score associated with a future action of the object; and the third machine-learned model determines the relevance score further based at least in part on at least one of the estimated action score.

K: The one or more non-transitory computer-readable media of paragraph J, wherein: the operations further comprise determining a future scenario based at least in part on a future action of the object and estimated action score associated therewith; and controlling the vehicle is based at least in part on the future scenario.

L: The one or more non-transitory computer-readable media of any one of paragraphs G-K, wherein the object is a first object and controlling the vehicle comprises: determining, by a planning component and based at least in part on first data associated with a second object, a trajectory for controlling the vehicle; and determining that the relevance score associated with the object is less than or equal to a threshold score, wherein determining the trajectory is independent of second data associated with the first object based at least in part on determining that the relevance score is less than or equal to the threshold score.

M: The one or more non-transitory computer-readable media of any one of paragraphs G-L, wherein third machine-learned model determines the relevance score further based at least in part on a graph representation indicating at least one of a lane location, a lane dimension, a junction location, a junction dimension, or an annotation.

N: The one or more non-transitory computer-readable media of any one of paragraphs G-M, wherein: the object is a first object, the vehicle is a first vehicle, and the environment is a first environment; the first machine-learned model, the second machine-learned model, and the third machine-learned model are trained using training data determined from log data indicating movement of a second object in a second environment relative to a second vehicle; and generating the training data comprises determining, based at least in part on a rule set and the log data, a training score associated with the second object.

O: The one or more non-transitory computer-readable media of paragraph N, wherein the rule set comprises a scoring function that is based at least in part on at least one of: determining, based at least in part on the log data, an interaction between the second object and the second vehicle by: determining a grid associated with the environment comprising a cell associated with a portion of the environment, determining, based at least in part on the log data, that the second object and the second vehicle were located within the cell at different points in time, the different points in time including a first time and a second time, and quantifying the interaction based at least in part on at least one of a difference in time between the first time and the second time or a distance between a first location occupied by the second object within the cell and a second location occupied by the second vehicle within the cell; determining, based at least in part on the log data, that the second object yielded to the second vehicle; determining, based at least in part on the log data, that the second vehicle yielded to the second object; determining, based at least in part on the log data, that the second vehicle followed the second object; or determining, based at least in part on the log data, that the second object followed the second vehicle.

P: A method comprising: receiving, based at least in part on sensor data, a top-down representation of an environment and a track associated with an object; determining, by a first machine-learned model and based at least in part on the top-down representation, a first intermediate output; determining, by a second machine-learned model and based at least in part on the track, a second intermediate output; determining, by a third machine-learned model and based at least in part on the first intermediate output and the second intermediate output, a relevance score associated with the object indicating an extent to which an action associated with the object is associated with a vehicle; and controlling the vehicle based at least in part on the relevance score.

Q: The method of paragraph P, wherein the first machine-learned model comprises a convolutional neural network, the second machine-learned model comprises a graph neural network, and the third machine-learned model comprises a multi-layer perceptron.

R: The method of either paragraph P or Q, wherein the first machine-learned model comprises a graph neural network, the second machine-learned model comprises a graph neural network, and the third machine-learned model comprises a multi-layer perceptron.

S: The method of any one of paragraphs P-R, wherein: the method further comprises determining, by a fourth machine-learned model and based at least in part on the first intermediate output and the second intermediate output, an estimated action score associated with a future action of the object; and the third machine-learned model determines the relevance score further based at least in part on at least one of the estimated action score.

T. The method of any one of paragraphs P-S, wherein the object is a first object and controlling the vehicle comprises: determining, by a planning component and based at least in part on first data associated with a second object, a trajectory for controlling the vehicle; and determining that the relevance score associated with the object is less than or equal to a threshold score, wherein determining the trajectory is independent of second data associated with the first object based at least in part on determining that the relevance score is less than or equal to the threshold score.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
a non-transitory memory storing processor-executable instructions that, when executed by the one or more processors, cause the system to perform operations comprising:
receiving sensor data;
determining, based at least in part on the sensor data, a top-down representation of an environment;
determining, based at least in part on the sensor data, a track associated with an object, the track representing a state of the object at multiple timesteps;
determining, by a first machine-learned model and based at least in part on the top-down representation, a first intermediate output;
determining, by a second machine-learned model and based at least in part on the track, a second intermediate output;
determining, by a third machine-learned model and based at least in part on the first intermediate output and the second intermediate output, a relevance score associated with the object indicating an extent to which an action associated with the object is associated with a vehicle; and
controlling the vehicle based at least in part on the relevance score.

2. The system of claim 1, wherein the first machine-learned model comprises a convolutional neural network, the second machine-learned model comprises a graph neural network, and the third machine-learned model comprises a multi-layer perceptron.

3. The system of claim 1, wherein:
the second intermediate output comprises a graph feature; and
the operations further comprise determining a first portion of the graph feature associated with the object and associating the first portion with a second portion of the first intermediate output.

4. The system of claim 1, wherein:
the operations further comprise determining, by a fourth machine-learned model and based at least in part on the first intermediate output and the second intermediate output, an estimated action score associated with a future action of the object; and
the third machine-learned model determines the relevance score further based at least in part on the estimated action score.

5. The system of claim 1, wherein the object is a first object and controlling the vehicle comprises:
determining, by a planning component and based at least in part on first data associated with a second object, a trajectory for controlling the vehicle; and
determining that the relevance score associated with the first object is less than or equal to a threshold score, wherein determining the trajectory is independent of second data associated with the first object based at least in part on determining that the relevance score is less than or equal to the threshold score.

6. The system of claim 1, wherein:
the object is a first object, the vehicle is a first vehicle, and the environment is a first environment;
the first machine-learned model, the second machine-learned model, and the third machine-learned model are trained using training data determined from log data indicating movement of a second object in a second environment relative to a second vehicle or the first vehicle; and
generating the training data comprises determining, based at least in part on a rule set and the log data, a training score associated with the second object.

7. One or more non-transitory computer-readable media storing processor-executable instructions that, when executed by one or more processors, cause the one or more processors to perform operations comprising:
receiving sensor data;
determining, based at least in part on the sensor data, a top-down representation of an environment;
determining, based at least in part on the sensor data, a track associated with an object, the track representing a state of the object at multiple timesteps;
determining, by a first machine-learned model and based at least in part on the top-down representation, a first intermediate output;
determining, by a second machine-learned model and based at least in part on the track, a second intermediate output;
determining, by a third machine-learned model and based at least in part on the first intermediate output and the second intermediate output, a relevance score associated with the object indicating an extent to which an action associated with the object is associated with a vehicle; and
controlling the vehicle based at least in part on the relevance score.

8. The one or more non-transitory computer-readable media of claim 7, wherein the first machine-learned model comprises a convolutional neural network, the second machine-learned model comprises a graph neural network, and the third machine-learned model comprises a multi-layer perceptron.

9. The one or more non-transitory computer-readable media of claim 7, wherein:
the second intermediate output comprises a graph feature; and
the operations further comprise determining a first portion of the graph feature associated with the object and associating the first portion with a second portion of the first intermediate output.

10. The one or more non-transitory computer-readable media of claim 7, wherein:
the operations further comprise determining, by a fourth machine-learned model and based at least in part on the first intermediate output and the second intermediate output, an estimated action score associated with a future action of the object; and
the third machine-learned model determines the relevance score further based at least in part on the estimated action score.

11. The one or more non-transitory computer-readable media of claim 10, wherein:
the operations further comprise determining, based at least in part on a future action of the object and the estimated action score, a future scenario; and
controlling the vehicle is based at least in part on the future scenario.

12. The one or more non-transitory computer-readable media of claim 7, wherein the object is a first object and controlling the vehicle comprises:

determining, by a planning component and based at least in part on first data associated with a second object, a trajectory for controlling the vehicle; and determining that the relevance score associated with the first object is less than or equal to a threshold score, wherein determining the trajectory is independent of second data associated with the first object based at least in part on determining that the relevance score is less than or equal to the threshold score.

13. The one or more non-transitory computer-readable media of claim 7, wherein the third machine-learned model determines the relevance score further based at least in part on a graph representation indicating at least one of a lane location, a lane dimension, a junction location, a junction dimension, or an annotation.

14. The one or more non-transitory computer-readable media of claim 7, wherein:
the object is a first object, the vehicle is a first vehicle, and the environment is a first environment;
the first machine-learned model, the second machine-learned model, and the third machine-learned model are trained using training data determined from log data indicating movement of a second object in a second environment relative to a second vehicle; and
generating the training data comprises determining, based at least in part on a rule set and the log data, a training score associated with the second object.

15. The one or more non-transitory computer-readable media of claim 14, wherein the rule set comprises a scoring function that is based at least in part on at least one of:
determining, based at least in part on the log data, an interaction between the second object and the second vehicle by:
determining a grid associated with the environment comprising a cell associated with a portion of the environment,
determining, based at least in part on the log data, that the second object and the second vehicle were located within the cell at different points in time, the different points in time including a first time and a second time, and
quantifying the interaction based at least in part on at least one of a difference in time between the first time and the second time or a distance between a first location occupied by the second object within the cell and a second location occupied by the second vehicle within the cell;
determining, based at least in part on the log data, that the second object yielded to the second vehicle;
determining, based at least in part on the log data, that the second vehicle yielded to the second object;
determining, based at least in part on the log data, that the second vehicle followed the second object; or determining, based at least in part on the log data, that the second object followed the second vehicle.

16. A method comprising:
receiving, based at least in part on sensor data, a top-down representation of an environment and a track associated with an object, the track representing a state of the object at multiple timesteps;
determining, by a first machine-learned model and based at least in part on the top-down representation, a first intermediate output;
determining, by a second machine-learned model and based at least in part on the track, a second intermediate output;
determining, by a third machine-learned model and based at least in part on the first intermediate output and the second intermediate output, a relevance score associated with the object indicating an extent to which an action associated with the object is associated with a vehicle; and
controlling the vehicle based at least in part on the relevance score.

17. The method of claim 16, wherein the first machine-learned model comprises a convolutional neural network, the second machine-learned model comprises a graph neural network, and the third machine-learned model comprises a multi-layer perceptron.

18. The method of claim 16, wherein the first machine-learned model comprises a first graph neural network, the second machine-learned model comprises a second graph neural network, and the third machine-learned model comprises a multi-layer perceptron.

19. The method of claim 16, wherein:
the method further comprises determining, by a fourth machine-learned model and based at least in part on the first intermediate output and the second intermediate output, an estimated action score associated with a future action of the object; and
the third machine-learned model determines the relevance score further based at least in part on the estimated action score.

20. The method of claim 16, wherein the object is a first object and controlling the vehicle comprises:
determining, by a planning component and based at least in part on first data associated with a second object, a trajectory for controlling the vehicle; and
determining that the relevance score associated with the first object is less than or equal to a threshold score,
wherein determining the trajectory is independent of second data associated with the first object based at least in part on determining that the relevance score is less than or equal to the threshold score.

* * * * *